(12) United States Patent
Snapp

(10) Patent No.: US 8,165,570 B2
(45) Date of Patent: Apr. 24, 2012

(54) SYSTEM, APPARATUS AND METHOD FOR AVAILING A MOBILE CALL OF CALLER NAME INFORMATION

(75) Inventor: John Lawrence Snapp, Westminster, CO (US)

(73) Assignee: West Corporation, Omaha, NE (US)

( * ) Notice: Subject to any disclaimer, the term of this patent is extended or adjusted under 35 U.S.C. 154(b) by 1021 days.

(21) Appl. No.: 12/014,259

(22) Filed: Jan. 15, 2008

(65) Prior Publication Data

US 2009/0181658 A1 Jul. 16, 2009

(51) Int. Cl.
*H04M 3/42* (2006.01)
(52) U.S. Cl. .................. 455/415; 379/142.06
(58) Field of Classification Search .......... 370/352; 455/415; 379/142.06
See application file for complete search history.

(56) References Cited

U.S. PATENT DOCUMENTS

| | | | |
|---|---|---|---|
| 6,236,365 B1 | 5/2001 | LeBlanc et al. | |
| 6,608,892 B2 | 8/2003 | Shaffer et al. | |
| 6,823,048 B2 * | 11/2004 | Gillespie | 379/88.19 |
| 6,925,378 B2 | 8/2005 | Tzamaloukas | |
| 6,952,181 B2 | 10/2005 | Karr et al. | |
| 7,107,285 B2 | 9/2006 | Von Kaenel et al. | |
| 7,136,474 B2 | 11/2006 | Shaffer et al. | |
| 7,158,500 B2 * | 1/2007 | Annamalai | 370/338 |
| 7,184,888 B2 | 2/2007 | Furukawa | |
| 7,203,300 B2 | 4/2007 | Shaffer et al. | |
| 7,263,438 B2 | 8/2007 | Furukawa | |
| 2003/0016804 A1 * | 1/2003 | Sheha et al. | 379/201.06 |
| 2003/0104812 A1 * | 6/2003 | Easley | 455/433 |
| 2004/0203613 A1 * | 10/2004 | Zhu et al. | 455/412.1 |
| 2006/0109960 A1 * | 5/2006 | D'Evelyn et al. | 379/37 |
| 2006/0276201 A1 | 12/2006 | Dupray | |
| 2007/0190968 A1 * | 8/2007 | Dickinson et al. | 455/404.1 |
| 2007/0280213 A1 * | 12/2007 | Sindhwani et al. | 370/356 |
| 2008/0192731 A1 * | 8/2008 | Dickinson | 370/352 |

* cited by examiner

*Primary Examiner* — Nick Corsaro
*Assistant Examiner* — Isaak R Jama

(57) ABSTRACT

An apparatus for availing a mobile call of caller name information includes: a query unit receiving the mobile call from a caller; an information gleaning unit coupled with the query unit; and at least one data base coupled with the gleaning unit. The query unit inquires whether caller name information is included with the call or a previous attempt has been made to obtain the name information. When the query unit determines that no name information is included with the call and no previous attempt was made, the gleaning unit cooperates with the at least one data base to obtain name information for inclusion with the call. When the query unit determines that name information is included with the call or a previous attempt was made to obtain the name information, the query unit effects onward routing of the call.

20 Claims, 3 Drawing Sheets

SYSTEM, APPARATUS AND METHOD FOR AVAILING A MOBILE CALL OF CALLER NAME INFORMATION

FIELD OF THE INVENTION

The present invention is directed to telecommunication systems, apparatuses and methods. The invention is especially directed to systems, apparatuses and methods for providing information identifying a registered user of the phone instrument (hereinafter referred to as "the caller") placing a call to accompany calls traversing a mobile telecommunications network.

BACKGROUND OF THE INVENTION

Special number calling systems such as E9-1-1 Emergency Service calling systems have originated and developed based upon an assumption that the origination locus of a special number call is known prior to the initiation of the call. This assumption is based on the fact that special number calls were developed based on landline telephony, wherein a telephone number was fixed at one location and thus represented a locus. The specific address and location at an address is associated with every telephone number that supports fully capable special number calling. Identification of residents or other occupants at the respective addresses was also provided. By way of example and not by way of limitation, in an E9-1-1 calling system, addresses and information relating to residents or occupants of respective addresses were provided for use in an Automatic Location Identification (ALI) data base for use by a Public Safety Answering Point (PSAP; sometimes referred to as a Public Safety Answering Position) when responding to an emergency service call.

Placement of special number calls such as, by way of example and not by way of limitation, emergency service calls from a mobile telecommunication device have recently been provided with accompanying identifying information relating to the originating instrument phone number and origin location. Location information may be expressed in terms of X-Y coordinates in a predetermined grid, in terms of Global Positioning System (GPS) coordinates or in other terms understood by or convertible to terms understood by a PSAP.

Known location information is preferably used to route E9-1-1 calls to an appropriate PSAP near the origin of the call. The same information may be used by the PSAP to support the emergency response to the call, such as dispatching fire, police or emergency medical personnel and equipment and for call back to the call originator if necessary. However, identity of residents or other occupants of an originating locus for a special number call is not provided with the call when the call is placed using a mobile phone. Identification of residents or other occupants of a locus may be useful when the locus is an apartment building or is near a house having no associated resident identity. Knowing identity of residents or occupants may assist emergency responder personnel in locating children, elderly persons or other survivors in a fire, building collapse or other emergency situation.

There is a need for a system, apparatus and method for availing a mobile call of caller name information.

SUMMARY OF THE INVENTION

An apparatus for availing a mobile call of caller name information includes: a query unit receiving the mobile call from a caller; an information gleaning unit coupled with the query unit; and at least one data base coupled with the gleaning unit. The information gleaning unit may be situated at any locus accessible by the query unit and the at least one data base. The information gleaning unit need not be associated with any particular network or equipment. The query unit inquires whether caller name information is included with the call or a previous attempt has been made to obtain the name information. When the query unit determines that no name information is included with the call and no previous attempt was made, the gleaning unit cooperates with the at least one data base to obtain name information for inclusion with the call. When the query unit determines that name information is included with the call or a previous attempt was made to obtain the name information, the query unit effects onward routing of the call.

A system for availing an extant mobile call of caller name information en route to a called party via a mobile telecommunication network, calls traversing the mobile telecommunication network including at least one caller-related data element, includes: (a) a query unit deployed in the mobile telecommunication network for affecting routing of the extant call to the called party; (b) an information gleaning unit coupled with the query unit; and (c) at least one data base coupled with the information gleaning unit. The at least one data base includes caller name information keyed with at least one selected caller-related data element The query unit, the information gleaning unit and the at least one data base cooperate to effect inclusion of available caller name information with the extant mobile call when the extant mobile call does not contain the caller name information and no previous inquiry has been made by the information gleaning unit seeking the caller name information for the extant mobile call. The query unit effects onward routing of the extant mobile call when the extant mobile call contains caller name information or a previous inquiry has been made by the information gleaning unit seeking the caller name information for the extant call.

A method for availing an extant mobile call of caller name information en route to a called party via a mobile telecommunication network; calls traversing the mobile telecommunication network including at least one caller-related data element; the method comprising: (a) in no particular order: (1) providing a query unit deployed in the mobile telecommunication network for affecting routing of the extant call to the called party; (2) providing an information gleaning unit coupled with the query unit; and (3) providing at least one data base coupled with the information gleaning unit. The at least one data base includes caller name information keyed with at least one selected caller-related data element of the at least one the caller-related data element. (b) operating the query unit, the information gleaning unit and the at least one data base cooperatively to effect inclusion of available the caller name information with the extant mobile call when the extant mobile call does not contain the caller name information and no previous inquiry has been made by the information gleaning unit seeking the caller name information for the extant mobile call. (c) operating the query unit to effect onward routing of the extant mobile call when the extant mobile call contains the caller name information or a previous inquiry has been made by the information gleaning unit seeking caller name information for the extant call.

It is, therefore a feature of the present invention to provide a system, apparatus and method for availing a mobile call of caller name information.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

For purposes of illustration, by way of example and not by way of limitation, the present invention will be discussed in the context of an emergency service network in the United States, commonly referred to as an E9-1-1 network. The teachings of the present invention are equally applicable, useful and novel in other special number calling systems, such as maintenance service networks, college campus security networks and other networks.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the context of this disclosure, the term "mobile phone" or "mobile calling instrument" or similar terms refers to any calling instruments whose geographic location may be changed by a user without cooperation by a carrier, or other service provider. By way of example and not by way of limitation, such mobile calling instruments may include cellular phones, Personal Digital Assistant (PDA) instruments, Voice over Internet Protocol (VoIP) instruments, Personal Communication System (PCS) instruments, and other similarly portable, wireless or mobile instruments.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
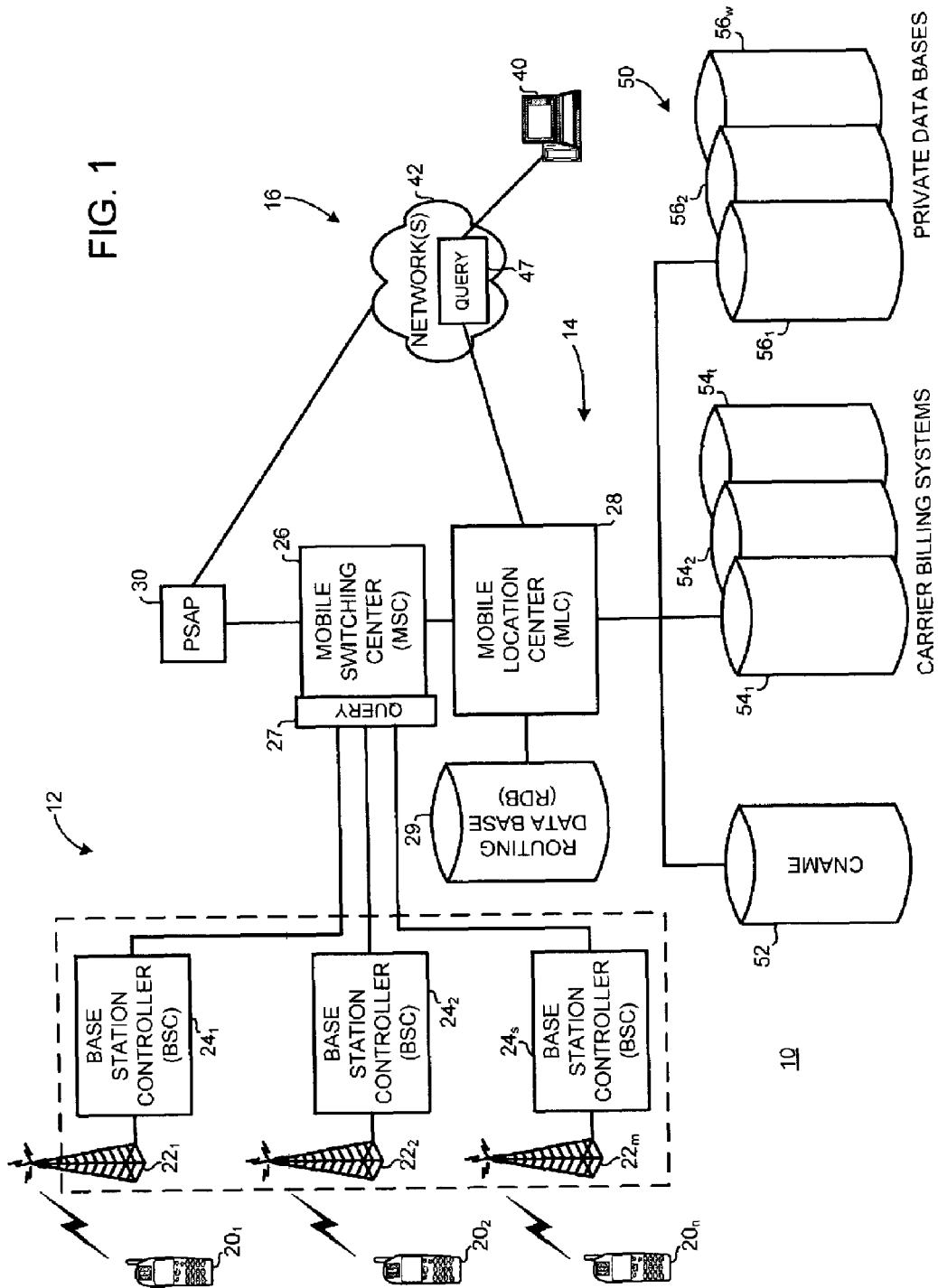
FIG. 1 is a schematic diagram illustrating a system employing the system of the present invention.

FIG. 1 is a schematic diagram illustrating a system employing the system of the present invention. In FIG. 1, a system 10 for handling wireless special number calls, such as wireless Emergency Service E9-1-1 calls, includes an originating wireless network section 12, a location section 14 and an originating Voice over Internet Protocol (VoIP) network section 16.

Originating wireless network section 12 includes a plurality of wireless phones $20_1, 20_2, 20_n$ in communication with a plurality of wireless communication antennas $22_1, 22_2, 22_m$ and an associated plurality of Base Station Controllers (BSC) $24_1, 24_2, 24_s$. Wireless phones $20_1, 20_2, 20_n$ may include, by way of example and not by way of limitation, cellular phones, personal digital assistant (PDA) instruments, personal communication system (PCS) instruments, and other similarly wireless calling instruments. Wireless network 12 may be implemented in any configuration using any protocol or standard. In a preferred embodiment, wireless network 12 is implemented according to the Global System for Mobile Communications (GSM; also sometimes referred to as Groupe Speciale Mobile) standard. The indicators "n", "m" and "s" are employed to signify that there can be any number of wireless phones, wireless communication antennas and BSCs in originating wireless network section 10. The inclusion of three wireless phones $20_1, 20_2, 20_n$; three wireless communication antennas $22_1, 22_2, 22_m$ and three BSCs $24_1, 24_2, 24_s$ in FIG. 1 is illustrative only and does not constitute any limitation regarding the number of wireless phones, wireless communication antennas and BSCs that may be included in an originating wireless network section 10 in the present invention. Moreover, it is not required that the numbers of wireless phones, wireless communication antennas and BSCs be equal.

Originating wireless network section 12 also includes at least one Mobile Switching Center (MSC) 26 coupled with base station controllers (BSC) $24_1, 24_2, 24_s$. MSC 26 includes a query unit 27 receiving mobile calls from BSCs $24_1, 24_2, 24_s$.

Originating Voice over Internet Protocol (VoIP) network section 16 includes a VoIP calling instrument 40 and at least one network, network(s) 42, for routing a call to PSAP 30. Network(s) 42 includes the Internet, and may include other networks for interfacing the Internet with a communication network for presenting calls from calling instrument 40 to PSAP 30, as will be understood by one skilled in the art of VoIP calling systems and emergency services call networks. A query unit 47 for receiving mobile calls from VoIP phone 40 is coupled within at least one network among network(s) 42.

Location server section 14 includes a Mobile Location Center (MLC) 28 and an associated Routing Data Base (RDB) 29 are coupled with MSC 26 for use by MSC 26 in determining location of a respective wireless phone $20_n$ or a respective VoIP phone 40. Location of a calling instrument is useful in routing an emergency service call to a convenient and preferably proximate PSAP 30 for handling the emergency reported by the emergency service call. MLC 28 preferably embodies functions performed by other units known by those skilled in the art of telecommunication networks such as, by way of example and not by way of limitation, a Serving Mobile Location Center (SMLC), Position Determining Entity (PDE), a Gateway Mobile Location Center (GMLC), a Mobile Positioning Center (MPC), a Home Location Register (HLR) and a Visitors' Location Register (VLR).

Query units 27, 47 are coupled with MLC 28. Query unit 27 poses a query regarding incoming wireless calls whether name information relating to the caller placing the respective extant wireless call is included with the extant wireless call. If the extant wireless call has accompanying caller identification query unit 27 (or query unit 27 in cooperation with MSC 26) effects onward routing of the extant wireless call to a PSAP 30. Query unit 47 poses a query regarding incoming VoIP calls whether name information relating to the caller placing the respective extant VoIP call is included with the extant VoIP call. If the extant VoIP call has accompanying caller identification query unit 47 effects onward routing of the extant VoIP call to PSAP 30.

Location server section 14 also includes a plurality of data bases 50 such as, by way of example and not by way of limitation, CNAME data base 52, telephone carrier billing system data bases $54_1, 54_2, 54_t$ and private data bases $56_1, 56_2, 56_w$. The indicators "t" and "w" are employed to signify that there can be any number of carrier billing system data bases and private data bases in location server section 14. The inclusion of three carrier billing system data bases 54₁, 54₂, 54ᵣ and three private data bases 56₁, 56₂, 56ᵥᵥ in FIG. 1 is illustrative only and does not constitute any limitation regarding the number of carrier billing system data bases and private data bases that may be included in a location server section in the present invention. CNAME data base 52 is a data base used to provide calling name display in connection with mobile-to-land calls. Private data bases 56ᵥᵥ may include, by way of example and not by way of limitation, reverse 9-1-1 data bases and other data bases relating at least one caller-related data element accompanying a call with a caller name.

If the extant wireless call does not have accompanying caller identification, MLC 28 queries data bases 50 as necessary to obtain caller name information for accompanying the extant wireless call in its onward routing to PSAP 30. If query unit 27 ascertains that no name information accompanies the extant wireless call, but an inquiry has been made of data bases 50, query unit 27 (or query unit 27 in cooperation with MSC 26) effects onward routing of the extant wireless call to a PSAP 30. If query unit 47 ascertains that no name information accompanies the extant VoIP call, but an inquiry has been made of data bases 50, query unit 47 effects onward routing of the extant VoIP call to a PSAP 30.

Figure 2:
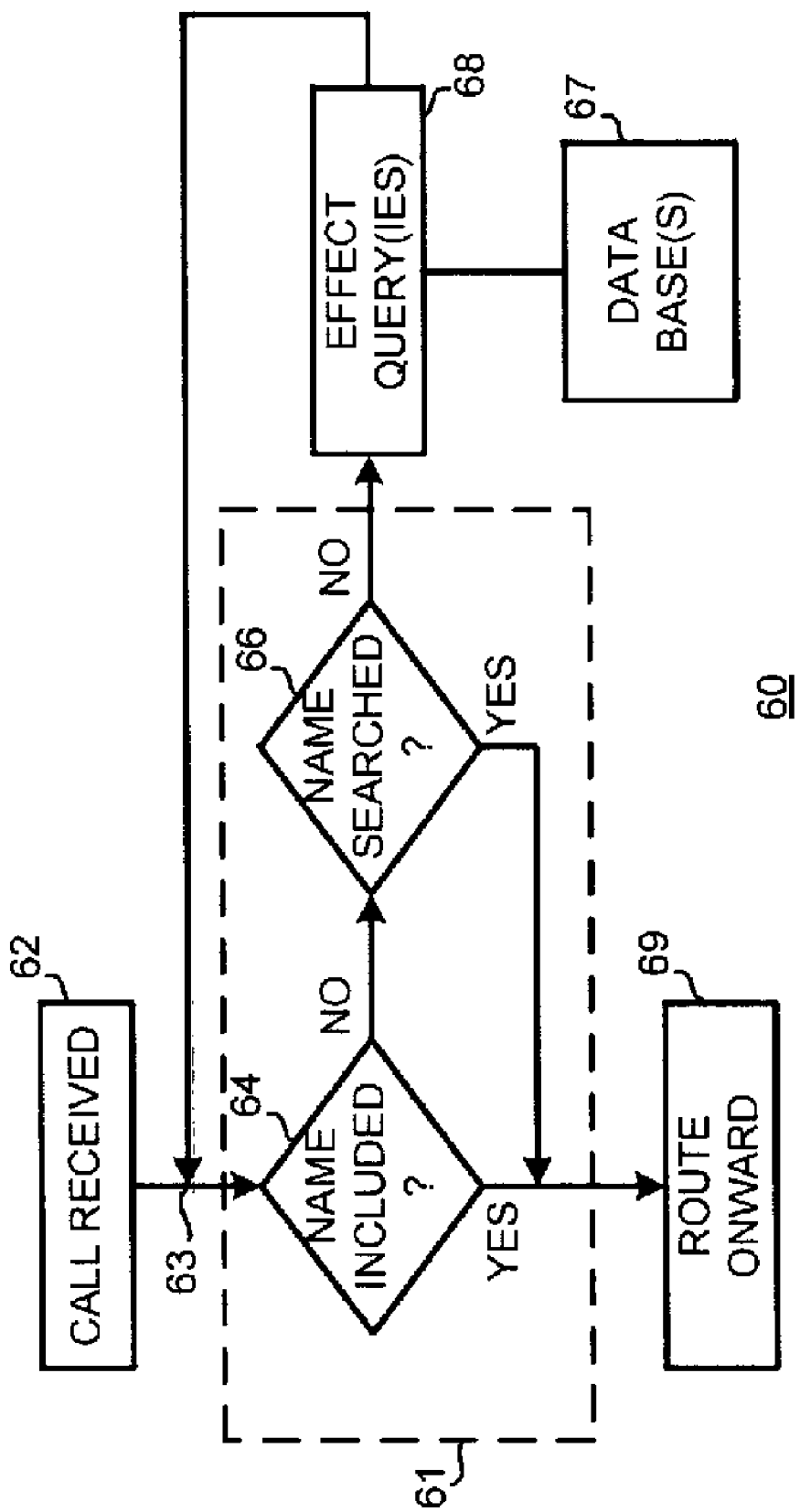
FIG. 2 is a schematic diagram illustrating operation of an apparatus according to the present invention that may be employed in the name query unit of the system illustrated in FIG. 1.

FIG. 2 is a schematic diagram illustrating operation of an apparatus according to the present invention that may be employed in the name query unit of the system illustrated in FIG. 1. In FIG. 2, an apparatus 60 receives an extant mobile call at an input locus 62. A query unit 61 receives the call from input locus 62. Query unit 61 includes a first query unit 64 and a second query unit 66. First query unit 64 poses a query whether caller name information is included with the extant call. If there is no caller name information included with the extant call, second query unit 66 poses a query whether a name information search has been effected regarding the extant call. If no name information search has been carried out regarding the extant call, then a name information search is carried out by an information gleaning unit 68 using data base(s) 67. Name information discovered in the search of data base(s) 67 is added to accompany the extant call. Apparatus 60 notes that a name information search was carried out regarding the extant call, as indicated by a connection between information gleaning unit 68 and a locus 63.

If name information accompanies the extant call, the YES indication proceeds from first query unit 64 and the extant call is routed onward, as indicated by block 69. If a name information search has been carried out regarding the extant call, the YES indication proceeds from second query unit 66 and the extant call is routed onward, as indicated by block 69.

Figure 3:
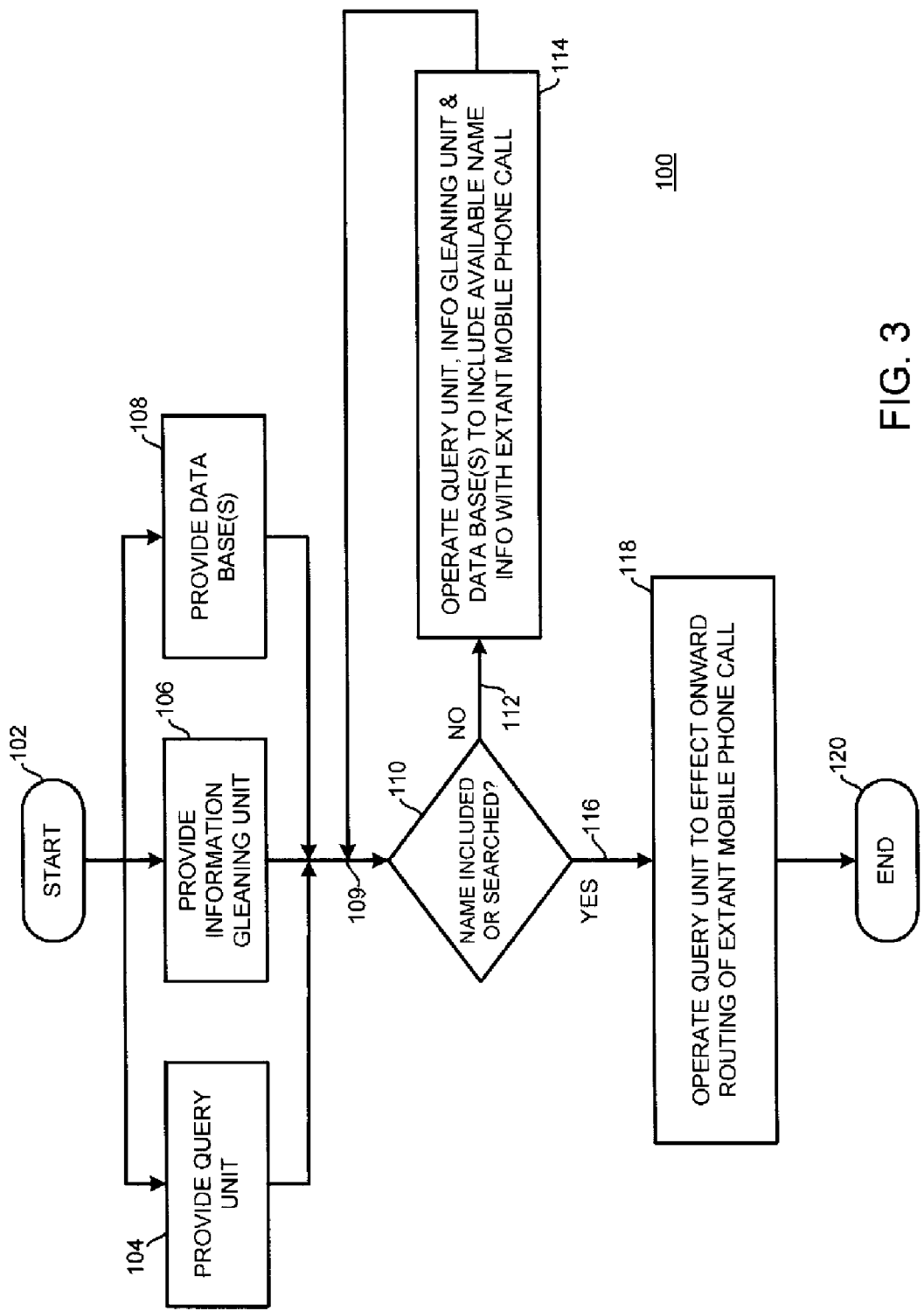
FIG. 3 is a flow diagram illustrating a method of the present invention.

FIG. 3 is a flow diagram illustrating a method of the present invention. In FIG. 3, a method 100 for availing an extant call of caller name information en route to a called party via a mobile telecommunication network begins at a START locus 102. The calls traverse a mobile telecommunication network and include at least one caller-related data element. Method 100 continues with, in no particular order: (1) providing a query unit deployed in the mobile telecommunication network for affecting routing of the extant call to the called party, as indicate by a block 104; (2) providing an information gleaning unit coupled with the query unit, as indicate by a block 106; and (3) providing at least one data base coupled with the information gleaning unit, as indicate by a block 108. The at least one data base includes the caller name information keyed with at least one selected caller-related data element of the at least one the caller-related data element.

Method 100 next poses a query whether the extant mobile call contains the caller name information or a previous inquiry has been made by the information gleaning unit seeking the caller name information for the extant mobile call, as indicated by a query block 110.

When the extant mobile call does not contain the caller name information and no previous inquiry has been made by the information gleaning unit seeking the caller name information for the extant mobile call, method 100 proceeds from query block 110 via NO response line 112. Method 100 continues with operating the query unit, the information gleaning unit and the at least one data base cooperatively to effect inclusion of available caller name information with the extant mobile call as indicated by a block 114. Method 100 proceeds from block 114 to a locus 109, effectively establishing that a previous inquiry has been made by the information gleaning unit seeking the caller name information for the extant mobile call.

When the extant mobile call does contain the caller name information or a previous inquiry has been made by the information gleaning unit seeking the caller name information for the extant mobile call, method 100 proceeds from query block 110 via YES response line 116.

Method 100 continues with operating the query unit to effect onward routing of the extant mobile call, as indicated by a block 118. Method 100 terminates at an END locus 120.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims:

The invention claimed is:

1. An apparatus for availing a mobile telecommunication call of caller name information; the apparatus comprising:
   (a) a query unit configured for receiving said mobile telecommunication call from a caller;
   (b) an information gleaning unit coupled with said query unit; and
   (c) at least one data base coupled with said information gleaning unit; said query unit configured to, in no particular order, pose queries to:
      (1) determine whether name information relating to said caller is included with said call; and
      (2) determine whether at least one previous attempt has been made to obtain said name information;
   if said query unit determines that neither query (1) nor query (2) may be answered affirmatively, said information gleaning unit accesses said at least one data base to obtain available said name information for inclusion with said call when said query unit effects onward routing of said call and repeats posing query 1 and query 2;
   if said query unit determines that either query (1) or query (2) may be answered affirmatively said query unit effects onward routing of said call.

2. An apparatus for availing a mobile telecommunication call of caller name information as recited in claim 1 wherein said mobile telecommunication call is placed from a mobile telephone.

3. An apparatus for availing a mobile telecommunication call of caller name information as recited in claim 1 wherein said mobile telecommunication call is placed from a voice over IP telephone.

4. An apparatus for availing a mobile telecommunication call of caller name information as recited in claim 2 wherein said mobile telecommunication call is an E9-1-1 emergency services call.

5. An apparatus for availing a mobile telecommunication call of caller name information as recited in claim 3 wherein said mobile telecommunication call is an E9-1-1 emergency services call.

6. An apparatus for availing a mobile telecommunication call of caller name information as recited in claim 2 wherein said query unit is co-located with a mobile switching center handling said mobile telecommunication call in a mobile telephone network.

7. An apparatus for availing a mobile telecommunication call of caller name information as recited in claim 5 wherein said onward routing effects presenting said call to a public service answering position.

8. A system for availing an extant mobile call of caller name information en route to a called party via a mobile telecommunication network; calls traversing said mobile telecommunication network including at least one caller-related data element; the system comprising:
   (a) a query unit; said query unit being coupled with said mobile telecommunication network for affecting routing of said extant call to said called party;
   (b) an information gleaning unit coupled with said query unit; and
   (c) at least one data base coupled with said information gleaning unit; said at least one data base including said caller name information keyed with at least one selected caller-related data element of said at least one said caller-related data element;
   said query unit configured to, in no particular order, pose queries to:
   (1) determine whether said caller name information is included with said extant mobile call; and
   (2) determine whether at least one previous inquiry has been made seeking said caller name information for said extant mobile call;
if said query unit determines that neither query (1) nor query (2) may be answered affirmatively, said information gleaning unit and said at least one data base cooperate cooperating to effect inclusion of available said caller name information with said extant mobile call and said query unit repeats posing query (1) and query (2); if said query unit determines that either query (1) or query (2) may be answered affirmatively, said query unit effecting onward routing of said extant mobile call.

9. A system for availing an extant mobile call of caller name information en route to a called party via a mobile telecommunication network as recited in claim 8 wherein said extant mobile call is placed from a mobile telephone.

10. A system for availing an extant mobile call of caller name information en route to a called party via a mobile telecommunication network as recited in claim 8 wherein said extant mobile call is placed from a voice over IP telephone.

11. A system for availing an extant mobile call of caller name information en route to a called party via a mobile telecommunication network as recited in claim 9 wherein said extant mobile call is an E9-1-1 emergency services call.

12. A system for availing an extant mobile call of caller name information en route to a called party via a mobile telecommunication network as recited in claim 10 wherein said extant mobile call is an E9-1-1 emergency services call.

13. A system for availing an extant mobile call of caller name information en route to a called party via a mobile telecommunication network as recited in claim 9 wherein said query unit is co-located with a mobile switching center handling said extant mobile call in a mobile telephone network.

14. A system for availing an extant mobile call of caller name information en route to a called party via a mobile telecommunication network as recited in claim 12 wherein said onward routing effects presenting said extant mobile call to a public service answering position.

15. A method for availing an extant mobile call of caller name information en route to a called party via a mobile telecommunication network; calls traversing said mobile telecommunication network including at least one caller-related data element; the method comprising:
   (a) in no particular order:
   (1) providing a query unit coupled with said mobile telecommunication network for affecting routing of said extant call to said called party;
   (2) providing an information gleaning unit coupled with said query unit; and
   (3) providing at least one data base coupled with said information gleaning unit; said at least one data base including said caller name information keyed with at least one selected caller-related data element of said at least one said caller-related data element;
   (b) operating said query unit, in no particular order, to pose queries to:
   (1) determine whether said caller name information is included with said extant mobile call; and
   (2) determine whether at least one previous inquiry has been made seeking said caller name information for said extant mobile call;
   (c) if said query unit determines that neither query (1) nor query (2) may be answered affirmatively, said information gleaning unit and said at least one data base cooperatively effecting inclusion of available said caller name information with said extant mobile call and said query unit repeats posing query (1) and query (2); and
   (d) if said query unit determines that either query (1) or query (2) may be answered affirmatively, operating said query unit to effect onward routing of said extant mobile call.

16. A method for availing an extant mobile call of caller name information en route to a called party via a mobile telecommunication network as recited in claim 15 wherein said extant mobile call is placed from a mobile telephone.

17. A method for availing an extant mobile call of caller name information en route to a called party via a mobile telecommunication network as recited in claim 15 wherein said extant mobile call is placed from a voice over IP telephone.

18. A method for availing an extant mobile call of caller name information en route to a called party via a mobile telecommunication network as recited in claim 16 wherein said extant mobile call is an E9-1-1 emergency services call.

19. A method for availing an extant mobile call of caller name information en route to a called party via a mobile telecommunication network as recited in claim 17 wherein said extant mobile call is an E9-1-1 emergency services call.

20. A method for availing an extant mobile call of caller name information en route to a called party via a mobile telecommunication network as recited in claim 16 wherein said query unit is co-located with a mobile switching center handling said extant mobile call in a mobile telephone network.

* * * * *